N. W. WHITBECK.
VALVE.
APPLICATION FILED JUNE 7, 1911.

1,060,219.

Patented Apr. 29, 1913.

WITNESSES:
Walter Greenburg
Richard Alspar

INVENTOR.
Neal W. Whitbeck
BY Charles E. Wising
his ATTORNEY.

UNITED STATES PATENT OFFICE.

NEAL W. WHITBECK, OF DETROIT, MICHIGAN.

VALVE.

1,060,219.  Specification of Letters Patent.  Patented Apr. 29, 1913.

Application filed June 7, 1911. Serial No. 631,825.

*To all whom it may concern:*

Be it known that I, NEAL W. WHITBECK, a citizen of the United States, residing at Detroit, county of Wayne, State of Michigan, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

This invention relates to valves and an object of the invention is a simple and efficient means for preventing leakage around the stem or operating rod and avoiding the necessity of packing the stem with wicking or like material as is usual with valves of the ordinary type.

Another object of the invention is an efficient and inexpensive means for preventing a rotation of the valve disk or ring on its seat during the rotation of the stem to seat or unseat the disk.

The novelty of the invention is in the peculiar design and arrangement of the various parts, as hereinafter more fully described and claimed, whereby these and other objects may be accomplished at a minimum of expense in labor and material.

Figure 1:
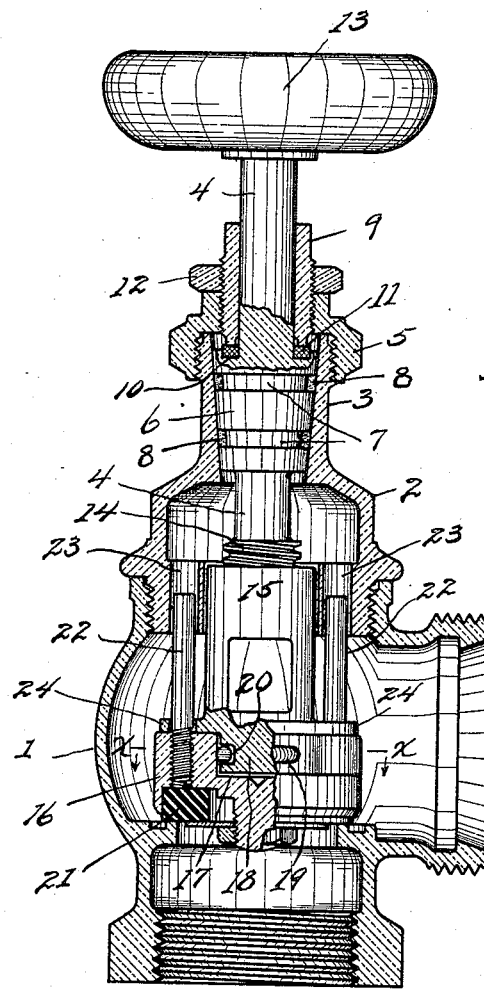
Figure 2:
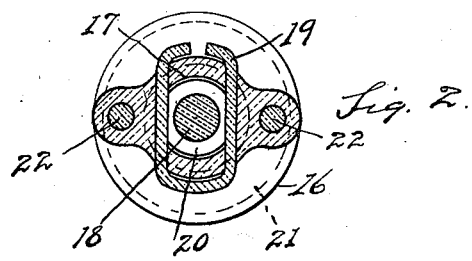

In the drawings—Figure 1 is a vertical section of a valve embodying my invention. Fig. 2 is a section on line $x$—$x$ of Fig. 1 showing the method of attaching the traveling nut to the valve head.

Similar characters refer to similar parts throughout the drawings and specification.

The body 1 of the valve is provided with a cap or bonnet 2 which has an extension or neck 3 through which the stem or rod 4 enters the body. The extension 3 is provided with a cap nut 5 and has a tapered seat for the cone 6 which is preferably formed integrally with the stem. The cone may be formed with one or more circumferential grooves 7 which are preferably filled with graphite or analogous material shown in section at 8. In filling the grooves with graphite, the entire surface of the cone to a greater or less extent becomes covered with said material and therefore, for ordinary use, it is unnecessary to grind the cone in its seat as the graphite will fill all tool marks or other irregularities in the two contact surfaces thus providing an efficient packing for the stem. For use with high pressure systems, however, it is advisable to grind the cone in its seat as a better contact between the two surfaces is thus produced and greater efficiency attained. The cone is held on its seat by the sleeve or gland 9 on the stem 4 which has a screw-threaded engagement with the cap nut 5. The upper and large end of the cone has an annular groove 10 for holding a soft metal ring or washer 11 against which the end of the sleeve 9 engages. The sleeve is provided with a lock nut 12 by means of which it is firmly held in its set position. The sleeve provides a means for taking up wear and the seat is made somewhat longer than the cone in order that the cone may be adjusted in vertical position as it wears without decreasing the amount of surface in contact with the seat.

The ring or washer 11 may be made of the same composition as the valve disk but is preferably made of soft metal, as lead, and in use it provides an efficient means for preventing leakage between the stem and sleeve 9 should, by any chance, leakage occur between the cone and its seat. Also, should this last mentioned condition arise, leakage can not occur between the cap nut 5 and the neck 3 or between the nut and sleeve 9 as the surfaces of the threads in both instances are held firmly in engagement by reason of the strain produced therebetween by screwing the sleeve against the washer 11.

On the upper end the valve stem or rod 4 is provided with a hand wheel 13 and at the lower end has screw threads 14 engaging the traveling nut 15 which in turn is secured to the valve head 16. The valve head is provided with a central annular chamber 17 into which an end 18 of the traveling nut is inserted and held in place by the two pronged pin 19 which passes through openings provided in the head 16 and engages in an annular groove 20 in the end 18 of the traveling nut. The valve head carries a ring 21 of the ordinary pattern and material which may be held in place by any suitable method as the nut and plate shown in Fig. 1.

The valve head is also provided with studs 22 extending upwardly therefrom each side of the nut 15 and loosely engaging in the holes 23 provided therefor in the cap 2. The studs may be screwed or pressed into place in the head and prevent a rotation of the valve ring on its seat when the stem 4 is rotated to seat or unseat the valve. The nut 15 is also held from rotation in the head 16 by the lugs 24 through openings in which the studs 22 pass.

In operation, the rotation of the stem 4 by the hand wheel opens or closes the passageway through the body by raising or lowering the valve ring away from or toward its seat by reason of the screw-threaded engagement of the stem with the traveling nut and the studs 22 riding in the holes 23 prevent a rotation of the valve head, as heretofore mentioned. The usual method of preventing such rotation is in providing the nut or similar member with wings or lugs which ride in slots or grooves formed in the bonnet or body by broaching which method involves considerable expense over the method herein disclosed.

The method herewith shown of preventing leakage around the stem of the valve, while simple and inexpensive, is very efficient in operation and avoids the necessity of frequently repacking the stem as is required when wicking or like material is used.

While the body 1 shown in the drawing is of a type more particularly adapted for use with radiators and the like, I do not wish to limit myself to such design as the novel features herein disclosed are adaptable for use in valves of various other types and forms, the alterations, if any, being of such nature that any one possessed of ordinary mechanical skill may change the size, form, or position of the parts to suit the required conditions.

What I claim as new and desire to secure by Letters Patent of the United States is—

1. In a valve, a body, a valve-head, said body having a passageway controlled by the valve-head, a valve operating rod provided with a cone fixed to rotate therewith, the rotation of the rod being adapted to open or close the passageway, said cone having circumferential grooves for holding graphite or the like, a seat for the cone, and means for holding the cone on its seat, said means involving an adjustable sleeve on the rod adapted to hold the cone on its seat, and means for locking the sleeve in its adjusted position.

2. In a valve, a body, a valve-head, said body having a passageway controlled by the valve-head, a valve operating rod having a cone fixed to rotate therewith, the rotation of the rod being adapted to open or close the passageway, said cone having grooves for holding graphite or the like, a seat for the cone, an adjustable sleeve on the rod adapted to hold the cone on its seat, and means for locking the sleeve in its adjusted position.

3. In a valve, a body, a valve-head, said body having a passageway controlled by the valve-head, a valve operating rod having a cone fixed to rotate therewith, the rotation of the rod being adapted to open or close the passageway, said cone having circumferential grooves for holding graphite or the like, a seat for the cone, said seat being of greater length than the cone, and adjustable means for holding the cone on its seat.

4. In a valve, a body, a valve, said body having a passageway controlled by the valve, a valve operating rod having a cone formed integrally therewith, the rotation of the rod being adapted to open or close the passageway, said cone having circumferential grooves for holding graphite or the like, a seat in the body for the cone, positively adjustable means for holding the cone on its seat, and means for locking the adjustable means in its adjusted position.

5. A valve operating rod provided with a circumferentially grooved cone fixed to rotate therewith, a seat for said cone, a valve head having a screw-threaded engagement with the rod, a soft metal washer carried on the large end of the cone, and an adjustable sleeve bearing on the washer to hold the cone on its seat.

6. A valve operating rod provided with a cone fixed to rotate therewith, said cone having grooves for holding graphite, a bonnet having a seat for the cone, a cap nut for the bonnet, and a sleeve on the rod having a screw-threaded engagement with the cap nut; said sleeve being adapted to hold the cone on its seat.

7. A valve operating rod having a cone formed integrally therewith, said cone having circumferential grooves for holding a packing, a bonnet having a seat for the cone, a cap nut for the bonnet, a sleeve on the rod having a screw-threaded engagement with the cap nut, a soft metal washer on the large end of the cone against which the sleeve engages, and a lock nut for the sleeve.

8. In a valve, a body, a valve-head, said body having a seat for the valve-head, a traveling nut secured to the valve, a valve operating rod having a screw-threaded engagement with the nut, means for preventing a rotation of the valve and nut, a cone on said rod fixed to rotate therewith, said cone having grooves for holding graphite or the like, a seat in the body for the cone, and means for holding the cone on its seat, said means comprising an adjustable sleeve and means for locking the sleeve in its adjusted position.

9. In a valve, a body, a valve head, a valve disk or ring carried by the head, a seat in the body for the valve disk or ring, a traveling nut secured to the valve-head, a rotatable valve operating rod having a screw-threaded engagement with the nut, and studs secured to the valve head and engaging in holes provided in the interior of the body whereby a rotation of the valve disk or ring on its seat is prevented.

10. In a valve, a body, a bonnet, a valve head, a valve disk or ring carried by the head, a seat in the body for said valve disk, a traveling nut secured to the valve head, a valve operating rod having a screw-threaded engagement with the nut, a cone on said rod fixed to rotate therewith, said cone having circumferential grooves for holding graphite, a seat for the cone in said bonnet, a cap nut for the bonnet, a sleeve on the rod having a screw-threaded engagement with the cap nut arranged to hold the cone on its seat, a lock nut for said sleeve, and studs secured to the valve head and engaging in holes provided therefor in the interior of the bonnet whereby a rotation of the valve disk or ring is prevented during its operation by the rod.

11. In a valve, a body, a valve head, said body having a passageway controlled by the valve, a valve operating rod provided with an enlargement of the shape of a truncated cone fixed to rotate therewith, the rotation of the rod being adapted to open or close the passageway, said cone shaped part having circumferential grooves for holding a packing, a bonnet having a seat for said cone shaped part, a cap-nut for the bonnet, a sleeve on the rod having a screw threaded engagement with the cap-nut, a soft metal washer positioned between the cone and the sleeve and a recess or pocket within which the washer is seated.

In testimony whereof, I sign this specification in the presence of two witnesses.

NEAL W. WHITBECK.

Witnesses:
RICHARD ALSPAS,
CLIFFORD CLARK.

---

Copies of this patent may be obtained for five cents each, by addressing the "Commissioner of Patents, Washington, D. C."